United States Patent [19]

Hamann et al.

[11] Patent Number: 4,761,294
[45] Date of Patent: Aug. 2, 1988

[54] PROCESS FOR PREPARING PARFRIED AND FROZEN POTATO STRIPS

[75] Inventors: Michael L. Hamann; Nicholas C. Guidinger, both of Caldwell, Id.

[73] Assignee: J. R. Simplot Company, Boise, Id.

[21] Appl. No.: 858,578

[22] Filed: Apr. 25, 1986

Related U.S. Application Data

[63] Continuation of Ser. No. 767,529, Aug. 20, 1985, abandoned, which is a continuation-in-part of Ser. No. 693,806, Jan. 23, 1985, abandoned.

[51] Int. Cl.⁴ .............................................. A23L 1/217
[52] U.S. Cl. .................................................... 426/438
[58] Field of Search ............... 426/637, 438, 441, 808, 426/465

[56] References Cited

U.S. PATENT DOCUMENTS

| | | |
|---|---|---|
| Re. 23,891 | 11/1954 | Chase ................................... 426/637 |
| 2,611,705 | 9/1952 | Hendel ................................. 426/438 |
| 3,355,299 | 11/1967 | McLaughlin et al. . |
| 3,397,993 | 8/1968 | Strong . |
| 3,594,188 | 7/1971 | Huxsoll . |
| 3,649,305 | 3/1972 | Wilder . |
| 3,669,685 | 6/1972 | Weaver et al. . |
| 3,669,686 | 6/1972 | Schech et al. . |
| 3,729,323 | 4/1973 | Nonaka et al. . |
| 3,812,274 | 5/1974 | Weaver et al. . |
| 3,846,572 | 11/1974 | Nonaka et al. . |
| 3,865,964 | 2/1975 | Kellermeier et al. . |
| 3,881,028 | 4/1975 | Capossela Jr. et al. . |
| 3,884,213 | 5/1975 | Smith . |
| 3,934,046 | 1/1976 | Weaver et al. . |
| 3,946,116 | 3/1976 | Weaver et al. . |
| 4,109,020 | 8/1978 | Gorfien et al. . |
| 4,154,861 | 5/1979 | Smith . |
| 4,219,575 | 8/1980 | Saunders et al. . |
| 4,228,196 | 10/1980 | Weaver et al. . |
| 4,254,153 | 3/1981 | Ross et al. . |
| 4,269,861 | 5/1981 | Caridis et al. . |
| 4,289,792 | 9/1981 | Smith . |
| 4,297,377 | 10/1981 | Harney et al. . |
| 4,317,842 | 3/1982 | El-Hag et al. . |
| 4,325,295 | 4/1982 | Caridis et al. . |
| 4,338,911 | 7/1982 | Smith . |
| 4,409,453 | 10/1983 | Smith . |
| 4,439,459 | 3/1984 | Swartley . |
| 4,447,459 | 5/1984 | Balboni et al. ................... 426/438 X |

FOREIGN PATENT DOCUMENTS

| | | |
|---|---|---|
| 806128 | 9/1969 | Canada . |
| 900266 | 5/1972 | Canada . |
| 900267 | 5/1972 | Canada . |
| 996813 | 9/1976 | Canada . |
| 2078081 | 7/1982 | United Kingdom . |

Primary Examiner—Arthur L. Corbin
Attorney, Agent, or Firm—Kelly, Bauersfeld & Lowry

[57] ABSTRACT

An improved process is provided for preparing parfried and frozen French fry potato strips for reconstitution for consumption by finish frying wherein the finish fry time period is substantially reduced. French fry potato strips which have been initially processed to a parfried and preferably frozen state, for example, in accordance with U.S. Pat. No. 3,397,993, are subjected to a hot air impingement step including exposure to relatively high velocity air at a selected temperature and for a controlled time period to achieve a rapid yet controlled reduction in strip moisture content and to texturize the outer skin surfaces of the strips without frying. The strips are then frozen and stored awaiting rapid reconstitution by finish frying in hot oil within a substantially reduced frying time, with the reconstituted strips exhibiting substantially optimum taste, color, and textural characteristics.

32 Claims, 1 Drawing Sheet

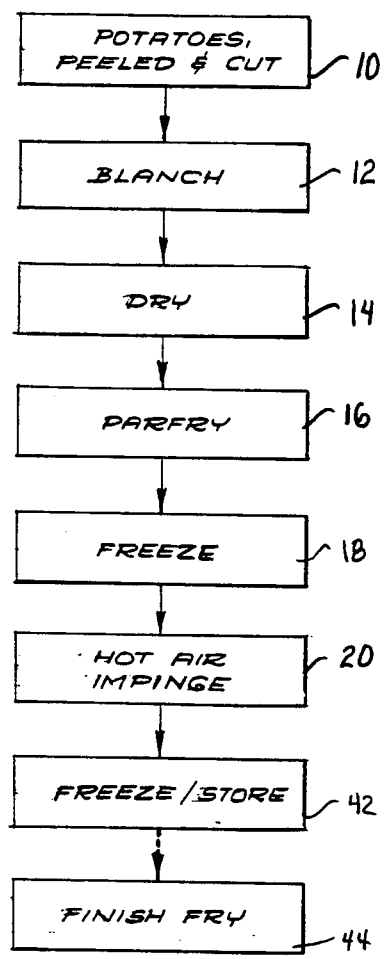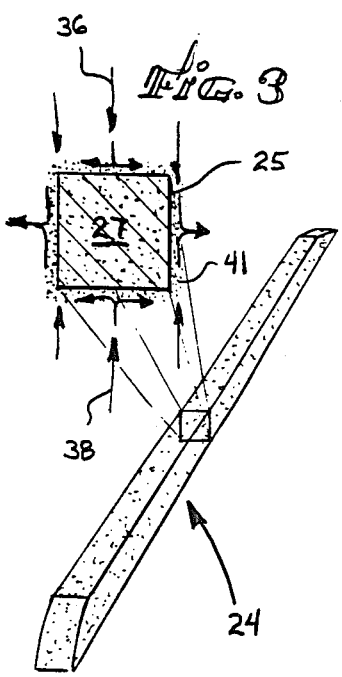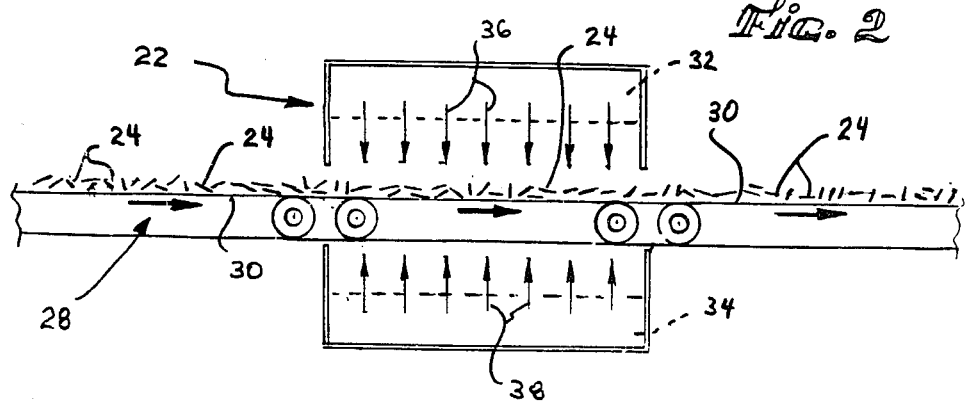

PROCESS FOR PREPARING PARFRIED AND FROZEN POTATO STRIPS

BACKGROUND OF THE INVENTION

This application is a continuation of application Ser. No. 767,529, filed Aug. 20, 1985, now abandoned which is a continuation-in-part of Ser. No. 693,806, filed Jan. 23, 1985 now abandoned.

This invention relates generally to processes for preparing French fry potato strips in a parfried and frozen state. More particularly, this invention relates to an improved French fry potato strip preparation process for significantly reducing the time required for reconstituting parfried and frozen strips for consumption substantially without detracting from a desirable set of strip taste, color, and textural characteristics.

A wide variety of processes for preparing parfried and frozen French fry potato strips are well known in the art. Such processes are generally designed for partially cooking and partially frying (parfrying) potato strips which are then frozen and stored in packages of selected size. When required for consumption, the parfried and frozen potato strips are reconstituted and finish cooked typically by finish frying in hot oil, although other methods of reconstitution, such as heating in a conventional or a microwave oven are sometimes used. It is desirable for the reconstituted French fry strips to exhibit a combination of taste, color, and textural characteristics closely resembling the characteristics of French fry strips prepared to completion from fresh potatoes.

Parfried and frozen French fry potato strips have gained widespread popularity in recent years, especially in the restaurant industry. More particularly, parfried potato strips in prepackaged quantities are easily stored in the frozen state awaiting reconstitution in accordance with customer demand without requiring the individual restaurant operator to provide the labor or equipment for peeling or cutting potatoes into French fry strips. When required for consumption, the French fry strips are removable from frozen storage quickly and easily and in a state ready for reconstitution, requiring only reheating equipment, such as hot oil frying equipment, which preferably occupies a relatively small portion of the restaurant kitchen. Moreover, in comparison with the time and labor required to produce French fry strips from raw potatoes, the parfried and frozen potato strips can be reconstituted for consumption relatively quickly and inexpensively.

Notwithstanding the foregoing labor- and equipment-saving benefits derived from using parfried and frozen French fry potato strips, there exists a need to further increase the output of available cooking equipment in a modern restaurant facility, thereby permitting an increased number of patrons to be served without requiring any capital outlay for additional cooking equipment. Alternatively, there exists a need for increasing the versatility of existing cooking equipment to accommodate a wider range of menu items. In many restaurants serving a relatively high volume of French fried potatoes, however, it has been necessary to use one or more hot oil fryers substantially exclusively for reconstituting parfried and frozen potato strips in order to meet customer demand. Other types of popular fried menu items, such as onion rings, chicken, and the like have required additional frying equipment which increases restaurant capital equipment assuming the existence of available kitchen floor space.

One approach to increasing the product output rate and/or the versatility of available frying equipment in a restaurant would be to decrease the finish fry reconstitution time for parfried and frozen potato strips. More particularly, following current preparation practices, parfried and frozen potato strips have required a finish fry reconstitution time in excess of two minutes and typically about three minutes or more to obtain a set of generally accepted high quality taste, color, and textural characteristics. Although shorter reconstitution fry times have been suggested, resultant French fry potato strips have exhibited undue limpness and sogginess, or alternately have been unacceptably dry, leathery and tough, depending upon the parfrying parameters and finish fry time and oil temperature. Restaurant operators conscious of French fry strip quality, therefore, have not accepted significantly shortened finish fry reconstitution times.

There exists, therefore, a significant need for an improved process for preparing parfried and frozen French fry potato strips which can subsequently be reconstituted by finish frying in a significantly reduced time period. The present invention fulfills these needs and provides further related advantages.

SUMMARY OF THE INVENTION

In accordance with the invention, an improved process is provided for preparing French fry potato strips in a parfried and preferably frozen state for subsequent reconstitution, particularly by finish frying in hot oil but with a significantly reduced finish fry time period. When reconstituted, the French fry potato strips prepared by the process of the present invention are ready for consumption and possess a high quality set of taste, color, and textural characteristics.

The improved preparation process comprises the steps of partially cooking, partially frying (par frying), and then reducing the temperature preferably by freezing French fry potato strips cut from raw potatoes. These parfried and frozen strips are then subjected to an air impingement drying and texturizing step including exposure to a flow of hot air at a temperature of about 300°–450° F. for a time period of about 1–9 minutes to achieve a rapid moisture loss of about 5–36 percent by weight from the frozen state, with the air flow being at a relatively high velocity substantially in excess of normal dryer air flows, with a preferred air flow rate being on the order of about 2,000 feet per minute. Preferably, this air impingement step is carried out by moving the strips substantially while frozen into and through vertically opposed, balanced, and generally uniformly distributed air flows which rapidly scrub moisture from the strips and impart a skin surface texturization thereto similar to a skin surface texture obtained from frying. The air impinged strips are then refrozen and stored awaiting finish fry reconstitution in hot oil, wherein the finish fry step can be completed in a substantially reduced time period.

In a preferred form of the improved preparation process, French fry potato strips are cut from whole raw potatoes to have a square cross-sectional shape of about 0.25–0.3 inch per side and a length ranging generally from about 2 to 6 inches. These potato strips are blanched by water or steam blanching followed by controlled drying, parfrying and freezing generally as described in U.S. Pat. No. 3,397,993, with the parfried and frozen strips having a moisture content of about 64 percent by weight. These parfried and frozen strips are placed on perforated screen conveyors and delivered while substantially frozen for passage through an air impingement oven wherein they are exposed to opposing and generally balanced high velocity hot air flows at a temperature of about 350°–400° F. and an air flow velocity of about 2,000 feet per minute and a time period of about 6–7 minutes. During the air impingement step, the strips undergo an approximate 22–23 percent weight loss from the frozen state due to moisture removal, exiting the air impingement oven with a moisture content of about 55 percent by weight. These strips are refrozen, packaged, and stored awaiting reconstitution for consumption.

The parfried, air impinged, and frozen potato strips prepared in accordance with the above-described preferred process are reconstituted rapidly by finish frying in hot oil at about 340° F. for about 90–120 seconds. The resultant French fry product exhibits excellent taste and color characteristics and further exhibits an exterior which is light, tender, and crispy and encases a desirably moist and mealy interior. This French fry product is virtually indistinguishable from one which has not undergone the air impingement step but instead has been finish fried for a longer conventional reconstitution fry time of about three minutes.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a block diagram illustrating one exemplary process for preparing parfried and frozen French fry potato strips, embodying the novel features of the invention;

FIG. 2 is a schematic view illustrating an exemplary air impingement oven for use in the process of the invention; and FIG. 3 is a perspective view of an illustrative French fry potato strip and further showing in exploded relation an enlarged cross section of said strip.

DETAILED DESCRIPTION OF THE PREFERRED EMBODIMENT

An improved process is provided for preparing parfried and frozen French fry potato strips, wherein the parfried and frozen strips can be reconstituted for consumption by finish frying within a significantly reduced fry time. The process includes the step of air impingement of parfried potato strips preferably while substantially in a frozen state to remove moisture from the strips rapidly yet in a controlled manner which simultaneously yields a desirable partial texturization of strip outer skin surfaces. The air impinged strips are refrozen and stored pending reconstitution.

The preparation process of the present invention advantageously permits a remarkable and substantial reduction in the finish fry time necessary to reconstitute frozen parfried French fry potato strips, without sacrificing or compromising a desired set of substantially optimum taste, color, and textural characteristics for the reconstituted product. By using potato strips prepared in accordance with the invention, therefore, the product output rate of one or more fryers can be significantly increased to accommodate, for example, customer demand at restaurants, without requiring the expense or the extra space needed for additional frying equipment. Alternatively, the total restaurant use time of one or more fryers attributable to French fry potato strips can be significantly reduced, thereby freeing the equipment for other uses including frying of other menu items, such as onion rings, chicken, and the like. The reduction in finish fry time does not reduce the quality characteristics of the French fry potato strips to permit continued preparation of uniformly high quality product.

As depicted generally in block form in FIG. 1, the improved French fry strip preparation process comprises a preliminary set of processing steps including partially cooking, partially frying (parfrying), and cooling preferably by freezing potato strips cut from raw whole potatoes, particularly of a variety such as Russet Burbanks, commonly used in the commercial scale production of French fried potatoes. More particularly, French fry potato strips are cut from washed and typically peeled raw potatoes as indicated by reference numeral 10 and then subjected to a preliminary blanching step 12, such as water or steam blanching, for a time and temperature chosen to partially cook the strips, with the specific time and temperature parameters being chosen in accordance with strip size and shape. In a typical commercial blanching process, the blanch time and temperature parameters are carefully controlled to provide sufficient heating to turn the strips to a generally translucent condition without overcooking to avoid undesired enzyme reactions or surface sloughing during subsequent processing. In many blanch processes, as is well known in the art, small amounts of dextrose and/or sodium acid pyrophosphate (SAPP) are included in the blanching medium for processing color control.

The potato strips are then removed from the blanch medium and excess water is removed therefrom preparatory to a parfrying step 16. In many preparation processes, however, the blanched strips are first subjected to a short dehydration or drying step 14 for controlled removal of some strip moisture by sequential exposure, for example, to upwardly and then downwardly directed hot air in a dryer or by exposure to ambient air for a short time period. Alternatively, in some processes, the strips are dried briefly and then allowed to stand in ambient air for a short time period permitting equilibration of moisture content throughout the strips.

The potato strips are then parfried in hot oil for a short time period to partially cook the strips while imparting a partial surface texturization rendering a crispness to the strip outer skin surfaces. In addition, during the parfrying step 16, the strips acquire a desired golden and slightly browned coloration generally considered desirable for French fried comestibles. The parfried strips are then removed from the oil and excess oil is drained therefrom, followed substantially immediately by a temperature reduction step and preferably a freezing step 18 in which the strips are rapidly and desirably completely frozen.

In accordance with a primary aspect of the invention, the parfried potato strips are subjected to the hot air impingement step 20 which removes additional moisture from the strips and further imparts additional desired texturization to the strip outer skin surfaces without frying. More specifically, the strips are exposed while substantially in a frozen state to a relatively high velocity flow of hot air having a velocity in excess of that required to fluidize a thin, substantially monolayer distribution of the strips. Moreover, this high velocity air has a temperature for rapidly scrubbing moisture from the strips to achieve an extremely rapid strip moisture loss in a short time period without burning or charring or rendering other undesirable characteristics, such as toughness, to the strips. This hot air impingement step is especially effective when the strips are frozen at least on the outer surfaces and preferably throughout due to surface cracks and other freeze-created surface disruptions which are believed to permit an extremely rapid moisture loss when initially subjected to the hot air impingement step. In addition, the hot air flow partially texturizes and conditions the outer skin surfaces of the strips to enhance surface characteristics, such as browning and crisping, typically obtained only by frying in hot oil.

A hot air impingement oven 22 for use in the air impingement step 20 is depicted schematically in FIG. 2, wherein the oven 22 may comprise, for example, an oven of the type manufactured by Lincoln Manufacturing Company, Inc., Fort Wayne, Ind. under the designation Model 1023 Warever. As shown, parfried and frozen potato strips 24 are placed onto a conveyor 28 substantially in a thin uniformly distributed layer (substantially a monolayer) wherein the conveyor includes a perforated belt 30 of chain mesh or the like for carrying the strips 24 in a continuous motion through the air impingement oven 22. The oven 22 include upper and lower hoods which substantially enclose the oven volume and further define upper and lower plenums 32 and 34 from which hot air is blown with substantial uniformity toward the potato strips 24 at a relatively high velocity substantially in excess of normal dryer air flows of 400–500 feet per minute and desirably also substantially in excess of a velocity required to fluidize the strips on the belt 30, such normal dryer air flows being insufficient to effect strip fluidization. Air flows on the order of about 2,000 feet per minute in generally balanced, vertically opposed flows distributed uniformly across the oven interior, as indicated respectively by arrows 36 and 38, are preferred. These air flows rapidly scrub moisture from the strips and are recirculated within the oven forwardly and rearwardly relative to the direction of conveyor movement for return to the plenums 32 and 34. For a further description of the oven construction and air flows and air circulation system, see U.S. Pat. No. 4,289,792 which is incorporated by reference herein.

The moisture loss mechanism as best understood is illustrated in FIG. 3 with respect to an exemplary potato strip 24 which has been previously parfried and frozen. This strip has a moisture content distributed with substantial uniformity throughout the cross-sectional area thereof, wherein this cross sectional area is defined by a slightly crisp outer skin surface 25 encasing a partially cooked interior 27. When subjected to the high velocity hot air impingement flow within the oven 22, as indicated by arrows 36 and 38 in FIGS. 2 and 3, the hot air flows intially heat and dehydrate the skin surface 25 to cause an outward moisture migration from the interior 27 toward and through the skin surface 25 resulting in an encapsulization of the strip in a film 41 of moisture predominantly in a vapor state. Unlike conventional drying equipment used in French fry potato strip processes, the high velocity air flows 36 and 38 effectively scrub the moisture film 41 away from the strips thereby preventing the film from acting as a barrier to further moisture loss as well as preventing reabsorption of the film when the strips exit the oven 22. Instead, removal of the moisture film 41 permits continued moisture migration and loss from the strip in an extremely short time period to achieve the desired moisture loss level, as will be described, before deleterious effects due to hot air exposure can occur. Moisture film removal also enhances the ability of the air flows to impart a texturing effect to the outer skin surface 25 which simulates a frying texture but is achieved in the absence of frying and related oil uptake.

The air impinged potato strips 24 exit the oven 22 on the conveyor 28 for travel to appropriate freezing equipment wherein the product is refrozen for storage as indicated by reference numeral 42 in FIG. 1. This step further may include packaging of the strip in measured weight units for shipment to a customer and maintenance in the frozen state awaiting reconstitution by finish frying for consumption.

When required for consumption, the potato strips prepared in accordance with the invention, are finish fried as indicated by reference numeral 44 to heat and finish cooking the strips. Importantly, this finish fry step can be performed in a substantially reduced frying time period on the order of one half the time required for French fry potato strips prepared by conventional parfry and freezing processes while still maintaining a substantially optimum set of taste, color, and textural characteristics. The product output rate for available frying equipment can thus be maximized.

While the process of the invention is applicable to a wide variety of French fry potato strip products of different sizes and shapes and prepared using different blanch and parfry parameters, the invention is especially effective for use with French fry potato strips having a square cross-sectional shape with side dimensions of about 0.25–0.3 inch per side, a mixture of lengths ranging between about 2–6 inches, and preliminarily processed generally in accordance with the process described in U.S. Pat. No. 3,397,993. More specifically, such potato strips are in sequence blanched to a generally translucent condition, partially dehydrated to achieve a moisture loss within the range of about 20–35 percent by weight from the raw state, and then parfried in hot oil for about 15–60 seconds at a temperature of about 300°–375° F. followed by substantial cooling preferably by freezing at least the outer skin surfaces of the strips and more preferably by freezing the strips throughout. After these preliminary cooking and parfrying steps, the strips exhibit a moisture content by weight of about 64 percent. The thus-parfried strips are then subjected to the air impingement step including generally balanced vertically opposed flows of hot air at a temperature of about 300°–450° F. and a flow rate of about 2,000 feet per minute for about 1–9 minutes, sufficient to achieve a moisture weight loss of about 5–36 percent from the parfried/frozen state, and more preferably within the narrower range of about 20–25 percent, whereupon the strips exhibit a moisture content by weight of about 55 percent. The strips are next refrozen and stored until reconstitution in hot oil of about 300°–375° F. for about 45 seconds to about 3 minutes depending upon the quantity of moisture removed during the air impingement step. The resultant reconstituted strips exhibit a light, tender, and desirably crisp exterior of a highly acceptable golden brown color encasing an equally highly acceptable moist and mealy interior. Excessive wetness and/or leathery and tough characteristics are not observed. The strips are substantially identical in all respects to conventionally prepared strips parfried and frozen to a moisture content of about 64 percent and then reconstituted by frying in hot oil at about 340° F. for approximately 3 minutes and 10 seconds.

In the presently most preferred form of the invention, the French fry strips described in the preceding paragraph are blanched in water followed by a dehydration step including exposure to sequentially upwardly and downwardly directed currents of warm air at about 180°–230° F. at about 400 feet per minute for about 6–10 minutes and followed in turn by a moisture equilibration step including exposure to ambient air for several minutes to achieve a moisture loss of about 22–25 percent from the raw state. The strips are then parfried in hot oil at about 350°–360° F. for about 40–45 seconds followed by draining of excess oil and prompt freezing. The parfried frozen strips are then subjected to the air impingement step including opposed hot air flows at about 350° F. and about 2,000 feet per minute for about 6–7 minutes, achieving a moisture weight loss of about 22–23 percent from the frozen state. These strips are then refrozen and reconstituted at a later time in hot oil at about 340° F. for 90 seconds. The reconstituted strips exhibit substantially optimum flavor, texture, and appearance characteristics.

The following test examples illustrate the invention:

EXAMPLE 1

A control group was prepared in accordance with French fry strips marketed by McDonald's restaurants by cutting French fry potato strips from whole potatoes to have a square cross section of about 0.28 inch per side and a mixture of lengths ranging from about 2–6 inches. These potato strips were preliminarily processed generally as described in U.S. Pat. No. 3,397,993 to include water blanching at 195° F. for about 3 minutes, followed by a drying step including exposure to warm air flows directly upwardly and then downwardly at about 200°–210° F. and flow rates of about 400 feet per minute for about 8.5 minutes, followed in turn by an equilibration step resting in ambient air for about 6 minutes. The potato strips were parfried in hot oil at 355° F. for 40–45 seconds and then frozen.

The French fry potato strips were then reconstituted without prior thawing by finish frying three pounds of strips in hot oil at a temperature of 340° F. for 3 minutes and 10 seconds. These strips were then drained briefly after removal from the hot oil and placed under a warming lamp. After about 5–7 minutes, the resultant product exhibited extremely high quality overall flavor, color, and texture characteristics. Specifically, the finish fried product strips had an overall slightly translucent appearance with a lightly browned exterior skin surface which was crisp and slightly crunchy yet tender without leatheriness or toughness. The outer skin surface encased a moist yet generally mealy interior which was neither too dry nor too wet.

EXAMPLE 2

French fry potato strips in accordance with Example 1 were similarly processed through blanching, drying, equilibrating, parfrying, and freezing steps. These strips were analyzed during processing for about 20–25 percent moisture loss by weight from the raw state during the drying step and about 7 percent moisture loss by weight during the parfry step. After freezing, the strips exhibited a moisture content of about 64 percent by weight.

The thus-parfried and frozen strips were conveyed substantially as a monolayer through a Lincoln Model 1023 Warever hot air impingement oven for exposure to vertically opposed hot air flows at about 2,000 feet per minute for 6 minutes, 30 seconds. Although the air temperature on the oven was set at 400° F., the air temperature adjacent the strips within the oven was measured to be about 350° F. These air impinged strips were refrozen, at which time they were analyzed for a moisture content of about 53–55 percent by weight.

The refrozen strips were reconstituted by finish frying three pounds in perforated baskets immersed in preheated cooking oil at 340° F. for 90 seconds. The strips were removed from the oil and drained briefly and placed beneath a warming lamp. Within about 5–7 minutes after removal from the oil, the strips were analyzed for taste, color, and internal/external texture and found to be virtually indistinguishable in any respect from the control group of Example 1.

EXAMPLE 3

Potato strips were processed in accordance with Example 2 except that the strips were reconstituted for a longer time of 105 seconds (1 minute, 45 seconds). These reconstituted strips were analyzed in the same manner as Example 2 and found to be only very slightly drier than those of Example 2, still yielding overall quality characteristics very close to the control group of Example 1.

EXAMPLE 4

French fry potato strips were prepared and reconstituted in accordance with Example 2, except that the air impingement step was performed with a higher impingement oven temperature setting of 450° F. Upon reconstitution, the potato strips generally were unacceptably dry with an undesired level of toughness. In addition, many of the strips exhibited an uneven texture, charred or slightly burned ends, and/or a caramelized flavor.

EXAMPLE 5

Potato strips were prepared and processed in accordance with Example 2, except that the air impingement oven temperature setting was adjusted to a lower setting of about 250° F. When reconstituted as described in Example 2 or as described in Example 3 the strips possessed a very uneven texture. Some of the strips were unsatisfactorily limp and wet and did not possess the desired crisp outer texture, while other strips were excessively wet and limp. The overall quality was unacceptable.

EXAMPLE 6

Potato strips were prepared and processed in accordance with Example 2, except that the air impingement step was performed with the strips spread with a bed depth averaging about 2¼ inch, lower oven temperature setting of about 300° F., and a longer impingement time of about 13 minutes to obtain the same percentage moisture loss during impingement as in Example 2, namely, about 23 percent by weight from the frozen state. The resultant strips on reconstitution were marginally acceptable with exteriors which were slightly tougher in texture and interiors which were inconsistent (some wetter, some drier) in comparison with the control group of Example 1 or the product of Example 2. The overall inconsistency of the resultant strip characteristics rendered this product unacceptable.

EXAMPLE 7

Potato strips were processed in accordance with Example 2, except that the air impingement step was increased in time to about 8 minutes, achieving a moisture loss from the frozen state of about 30 percent by weight. When reconstituted, these strips were distinctly drier and tougher, had a number of burned ends, and exhibited a degree of leatheriness in comparison with the products of Examples 1 and 2.

EXAMPLE 8

Potato strips were processed and prepared in accordance with Example 2, except that the air impingement step was decreased in time to about 5 minutes, yielding an impingement moisture loss of about 13 percent by weight. When reconstituted, these strips were noticeably wetter and many of the strips were unacceptably limp in comparison with the products of Examples 1 and 2.

EXAMPLE 9

French fry strips were parfried and frozen in accordance with Example 2, except that the air impingement step was substituted by a drying step wherein the strips were conveyed continuously through a dryer set to provide an upflow and then downflow of air at about 350° F. for 5 minutes, wherein the air flow rate was a conventional dryer air flow of about 400 feet per minute. The strips when refrozen exhibited a moisture loss of 22-23 percent by weight from the parfried/frozen state.

These strips were reconstituted per Example 2 and found to be somewhat wet and limp and further evidenced a somewhat uneven texture, with a few strips being unacceptably dry and tough.

EXAMPLE 10

French fry strips were processed per Example 9, except that the dryer time subsequent to parfrying and freezing was extended to about 7 minutes to achieve moisture loss of 28-30 percent by weight. When reconstituted, this product was somewhat dry and tough and also evidenced uneven character with a few strips which were too wet and limp.

EXAMPLE 11

French fry potato strips were processed in accordance with Example 1 (no air impingement step), except that the preparfrying drying step was increased in total time to about 14 minutes to achieve an increased moisture loss of about 39 percent from the raw state, which in turn yielded a parfried and frozen product having a moisture content of about 55 percent by weight. When reconstituted by finish frying in oil at 340° F. for 90 seconds, the final product was unacceptably dry, leathery, and tough.

EXAMPLE 12

Potato strips were processed following Example 1, except that the parfrying time was increased to 1 minute, 45 seconds to achieve a parfried and frozen product with a moisture content of about 55 percent by weight. These strips were reconstituted by finish frying in hot oil for 90 seconds at 340° F. The final product was far too dry and tough for acceptance.

From the foregoing examples, it can be seen that the improved process of the invention permits substantially reduced finish fry times without adverse effects upon product quality characteristics.

A variety of modifications and improvements to the process described herein are believed to be apparent to those skilled in the art. Accordingly, no limitation upon the invention is intended by way of the description, except as set forth in the appended claims.

What is claimed is:

1. A process for preparing parfried and frozen potato strips for subsequent reconstitution for consumption by finish frying in hot oil in a reduced finish fry time period, said process comprising the steps of:
    blanching the potato strips cut from raw potatoes to a generally translucent state;
    drying the blanched strips to remove moisture from the strips and thereby reduce the weight thereof by about 20 percent to about 35 percent from the raw state;
    parfrying the dried strips in hot oil at a temperature of about 300° F. to about 375° F. and for about 15 seconds to about 60 seconds;
    freezing the parfried strips;
    subjecting the parfried and frozen strips to an air impingement step including exposure to a flow of hot air at a temperature of about 300° F. to about 450° F. and a flow rate substantially greater than about 500 feet per minute for about 1 minute to about 9 minutes to texturize the outer skin surfaces of the strips and to remove moisture from the strips and thereby reduce the weight of the strips by about 5 percent to about 36 percent from the parfried and frozen state; and
    refreezing the air impinged strips, said freezing, air impingement, and refreezing steps proceeding in sequence without further parfrying of the strips between said parfrying and refreezing steps.

2. The process of claim 1 wherein the strips have a moisture content of about 64 percent by weight in the parfried and frozen state after said parfrying and freezing steps.

3. The process of claim 2 wherein the strips have a moisture content about 55 percent by weight after said refreezing step.

4. The process of claim 1 including the step of cutting the strips to have a generally square cross-sectional shape of about 0.25 to about 0.3 inch per side and a length distributed within the range of about 2 inches to about 6 inches.

5. The process of claim 4 wherein the potato strips are cut from Russet Burbank potatoes.

6. The process of claim 1 wherein the flow rate of the hot air impingement flow is on the order of about 2,000 feet per minute.

7. The process of claim 1 wherein the flow rate of the hot air impingement flow is substantially in excess of a flow rate required to fluidize a thin substantially monolayer distribution of the strips.

8. The process of claim 1 wherein said blanching step includes water blanching the strips.

9. The process of claim 1 wherein said blanching step includes steam blanching the strips.

10. The process of claim 1 wherein said drying step comprises subjecting the strips to a flow of warm air at a temperature of from about 180° F. to about 230° F. at a flow rate of about 400 feet per minute and for a time from about 6 minutes to about 10 minutes.

11. The process of claim 10 further including the step of allowing moisture equilibration of the strips between said drying and said parfrying steps.

12. The process of claim 13 wherein said equilibration step includes maintaining the strips in ambient air for about 6 minutes.

13. The process of claim 1 wherein said parfrying step comprises frying the strips in hot oil at a temperature of about 355° F. for about 40–45 seconds.

14. The process of claim 1 wherein said air impingement step comprises subjecting the strips to generally opposed, generally balanced air flows.

15. The process of claim 14 wherein the opposed air flows have a temperature of about 350° F. adjacent the strips and a flow rate of about 2,000 feet per minute, and the strips are subjected to said opposed air flows for about 6 minutes to about 7 minutes to reduce the weight of the strips from the parfried and frozen state by about 23 percent.

16. The process of claim 15 wherein the strips are conveyed through an air impingement oven having the opposed air flows therein in a generally vertical orientation, said strips being conveyed through the oven upon perforate support means.

17. The process of claim 1 further including the step of reconstituting the refrozen strips by finish frying in hot oil at a temperature of about 300° F. to about 375° F. for about 45 seconds to about three minutes.

18. The process of claim 17 wherein said finish frying step comprises frying the strips in hot oil at about 340° F.

19. The process of claim 18 wherein said finish frying step comprises frying the strips in hot oil for about 90 seconds to about 120 seconds.

20. In a process for preparing parfried and frozen potato strips for subsequent reconstitution for consumption by finish frying in hot oil in a reduced finish fry time period, said process including the steps of partially cooking, parfrying a single time, and then freezing the strips, the improvement consisting of the steps of:
subjecting the frozen strips to an air impingement step including exposure to a flow of hot air at a temperature of about 300° F. to about 450° F. and a flow rate substantially greater than about 500 feet per minute for about 1 minute to about 9 minutes to texturize the outer skin surfaces of the strips and to remove moisture from the strips and thereby reduce the weight of the strips by about 5 percent to about 36 percent from the frozen state; and
refreezing the air impinged strips.

21. The process of claim 20 wherein said air impingement step comprises subjecting the strips to generally opposed, generally balanced air flows.

22. The process of claim 21 wherein the opposed air flows have a temperature of about 350° F. adjacent the strips and a flow rate of about 2,000 feet per minute, and the strips are subjected to said opposed air flows for about 6 minutes to about 7 minutes to reduce the weight of the strips from the frozen state by about 23 percent.

23. The process of claim 20 further including the step of reconstituting the refrozen strips by finish frying in hot oil at a temperature of about 300° F. to about 375° F. for about 45 seconds to about three minutes.

24. A process for preparing parfried and frozen potato strips for subsequent reconstitution for consumption, said process comprising the steps of:
blanching the potato strips;
parfrying the potato strips;
freezing at least the outer skin surfaces of the parfried strips;
subjecting the parfried and frozen potato strips while substantially in a frozen state to an air impingement step including exposure to a flow of hot air at a temperature of about 300° F. to about 450° F. and a flow rate on the order of about 2,000 feet per minute for a period of time sufficient to reduce the weight of the strips by moisture removal approximately 20 percent to about 25 percent by weight; and
refreezing the air impinged strips, said air impingement and refreezing steps proceeding in sequence substantially without further parfrying of the strips subsequent to said parfrying step.

25. The process of claim 24 further including the step of partially dehydrating the strips between said blanching and parfrying steps.

26. The process of claim 24 further including the step of reconstituting the refrozen strips by finish frying in hot oil at a temperature of 300° F. to about 375° F. for about 90 seconds to about 120 seconds.

27. A process for preparing parfried and frozen potato strips for subsequent reconstitution for consumption, comprising the steps of:
cutting the potato strips from raw potatoes to have a generally square cross-sectional shape of about 0.25 to about 0.3 inches per side and a length distributed within the range of about 2 inches to about 6 inches;
partially cooking and parfrying the strips to a moisture content of about 64 percent by weight;
freezing the parfried strips;
subjecting the frozen strips without further parfrying to an air impingement step including a flow of hot air at a temperature of about 300° F. to about 450° F. and a flow rate on the order of about 2,000 feet per minute for a period of time sufficient to reduce the moisture content of the strips to about 55 percent by weight; and then
refreezing the strips without further parfrying.

28. The process of claim 27 further including the step of reconstituting the refrozen strips by finish frying in hot oil at a temperature of 300° F. to about 375° F. for about 90 seconds to about 120 seconds.

29. The process of claim 27 further including a drying step before said parfrying step for reducing the weight of the strips by about 20 percent to about 35 percent from the raw state.

30. The process of claim 27 wherein an air impingement step is continued for a period of time sufficient to reduce the weight of the strips by about 20 percent to about 25 percent from the frozen state.

31. A process for preparing parfried and frozen potato strips for subsequent reconstitution for consumption by finish frying in hot oil in a reduced finish fry time period, said process comprising the steps of:
cutting the potato strips from raw potatoes to have a generally square cross-sectional shape of about 0.25 to about 0.3 inches per side and a length distributed within the range of about 2 inches to about 6 inches;

blanching the potato strips in water at a temperature of about 195° F. for about 3 minutes;

drying the blanched strips in warm air at a temperature within the range of about 180° F. to about 230° F. and a flow rate of about 400 feet per minute for a time period of about 6 minutes to about 10 minutes;

allowing the dried strips to equilibrate in ambient air for a short time period;

parfrying the strips by immersing the strips in hot oil at a temperature of about 355° F. for about 40–45 seconds;

removing the strips from the hot oil at the conclusion of said parfrying step;

freezing the parfried strips;

subjecting the frozen strips to generally opposed and substantially balanced air flows of hot impingement air at a temperature of about 350° F. at flow rates of about 2,000 feet per minute for about 6 minutes to about 7 minutes; and then refreezing the strips, said strips remaining removed from immersion in the hot oil throughout said freezing, air impingement, and refreezing steps.

32. The process of claim 31 further including the step of reconstituting the refrozen strips by finish frying in hot oil at a temperature of 300° F. to about 375° F. for about 90 seconds to about 120 seconds.

* * * * *